US 6,722,644 B1

United States Patent
Prosser

(10) Patent No.: US 6,722,644 B1
(45) Date of Patent: *Apr. 20, 2004

(54) CUTTING BOARD WITH DRAIN HOLES AND FITTED TROUGH

(76) Inventor: Michael J. Prosser, 1125 A St., Coeur 'd alene, ID (US) 83814

( * ) Notice: Subject to any disclaimer, the term of this patent is extended or adjusted under 35 U.S.C. 154(b) by 0 days.

This patent is subject to a terminal disclaimer.

(21) Appl. No.: 10/090,084

(22) Filed: Feb. 27, 2002

Related U.S. Application Data

(63) Continuation-in-part of application No. 09/713,304, filed on Nov. 16, 2000, now Pat. No. 6,386,531.
(60) Provisional application No. 60/165,824, filed on Nov. 16, 1999.

(51) Int. Cl.[7] ............................................. B23Q 3/00
(52) U.S. Cl. ................................................. 269/289 R
(58) Field of Search ...................... 269/289 R, 302.1, 269/15–16; 99/446

(56) References Cited

U.S. PATENT DOCUMENTS

| 1,745,805 A | 2/1930 | Miller |
| 4,653,737 A | 3/1987 | Haskins et al. |
| 4,907,789 A | 3/1990 | Tice |
| D348,809 S | 7/1994 | Ladwig |
| 5,366,208 A | 11/1994 | Benjamin |
| 5,527,022 A | 6/1996 | Gibson |
| 6,386,531 B1 | 5/2002 | Prosser |

*Primary Examiner*—Robert C. Watson
(74) *Attorney, Agent, or Firm*—Glenn C. Brown

(57) ABSTRACT

A cutting board having medial and peripheral drain holes to remove the juices, drippings, and food trimmings produced during the preparation of foods. A trough traverses the periphery of the cutting board to ensure complete drainage of the fluids from the cutting surface. The cutting board of the present invention allows for the clean, efficient preparation of foods and eliminates food contamination resulting from the juices of raw food contacting other food

3 Claims, 3 Drawing Sheets

CUTTING BOARD WITH DRAIN HOLES AND FITTED TROUGH

CROSS REFERENCE TO RELATED APPLICATIONS

This application is a continuation-in-part of U.S. Ser. No. 09/713,304, filed on Nov. 16, 2000, which is a continuation of U.S. provisional patent application Ser. No. 60/165,824, filed on Nov. 16, 1999. The priority of these prior applications is expressly claimed and their disclosures are hereby incorporated by reference in their entirety.

BACKGROUND OF THE INVENTION

1. Field of the Invention

The present invention relates generally to cutting boards and more particularly, to a cutting board with drain holes distributed across the cutting surface. The drain holes remove the juices or fluids of the food being prepared.

2. Description of Related Art

Safe food handling is an essential component of safe food preparation which is necessary to eliminate food contamination resulting from the juices of raw food, such as meat or poultry, contacting other foods. Cutting boards are commonly used as platforms for supporting food items to be cut and sliced. During the cutting or carving process, juices, drippings, and food trimmings are produced and if they are not properly handled, food contamination with its potentially detrimental consequences will result.

The prior art describes a number of cutting boards used to prepare food items, for example, an ornamental design for a perforated cutting board is shown in U.S. Pat. Des. No. 348,809, issued on Jul. 19, 1994, to T. O. Ladwig. U.S. Pat. No. 4,653,737, issued on Mar. 31, 1987, to L. A. Haskins, et al., describes a device for the trimming, cutting, and cleanup of foodstuffs. The device uses a flat surfaced cutting board with at least one aperture for removing food scraps to a first storage area beneath the cutting board and for removing useable food portions separately to a second storage area beneath the cutting board.

A cutting board assembly is described in U.S. Pat. No. 4,907,789, issued on Mar. 13, 1990, to R. Tice. The assembly includes a board member which has an upper cutting surface with a groove around the periphery. A removable container or plastic bag is adapted to fit over a leg of an L-shaped flange which extends outwardly from an elongated slot. U.S. Pat. No. 5,366,208, issued on Nov. 22, 1994, to W. Benjamin, describes a cutting board system. The cutting board system provides both a cutting board and a drip pan tray for receiving juices and trimmings which are cut from food articles. A cutting board for cutting food articles is described in U.S. Pat. No. 5,527,022, issued on Jun. 18, 1996, to J. H. Gibson. The cutting board comprises a cutting surface, a bottom surface, a juice channel, a sloping guide plane, and a leveling means.

None of the above inventions and patents, taken either singly or in combination, is seen to describe the instant invention as claimed.

SUMMARY OF THE INVENTION

Accordingly, it is a principal object of the invention to provide a cutting board that quickly and efficiently removes juices, drippings, and food trimmings from a cutting surface during a cutting or carving process.

It is another object of the invention to provide a cutting board that eliminates food contamination by ensuring that the juices from raw foods are not inadvertently spread.

It is a further object of the invention to provide a cutting board that is easily cleaned.

It is an object of the invention to provide improved elements and arrangements thereof in a cutting board for the purposes described which is inexpensive, dependable and fully effective in accomplishing its intended purposes.

The foregoing are achieved in accordance with the present invention by providing a cutting board with strategically placed drain holes that quickly and efficiently remove the juices, drippings, and food trimmings from the cutting surface during the cutting or carving of a food item. The cutting board employs the use of large diameter drain holes in the cutting surface itself and the use of a peripheral trough with its own drain holes to drain any juices or drippings that flow over the sides of the cutting surface. A pan receptacle is disposed beneath the cutting board to collect the juices, drippings, and food trimmings.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
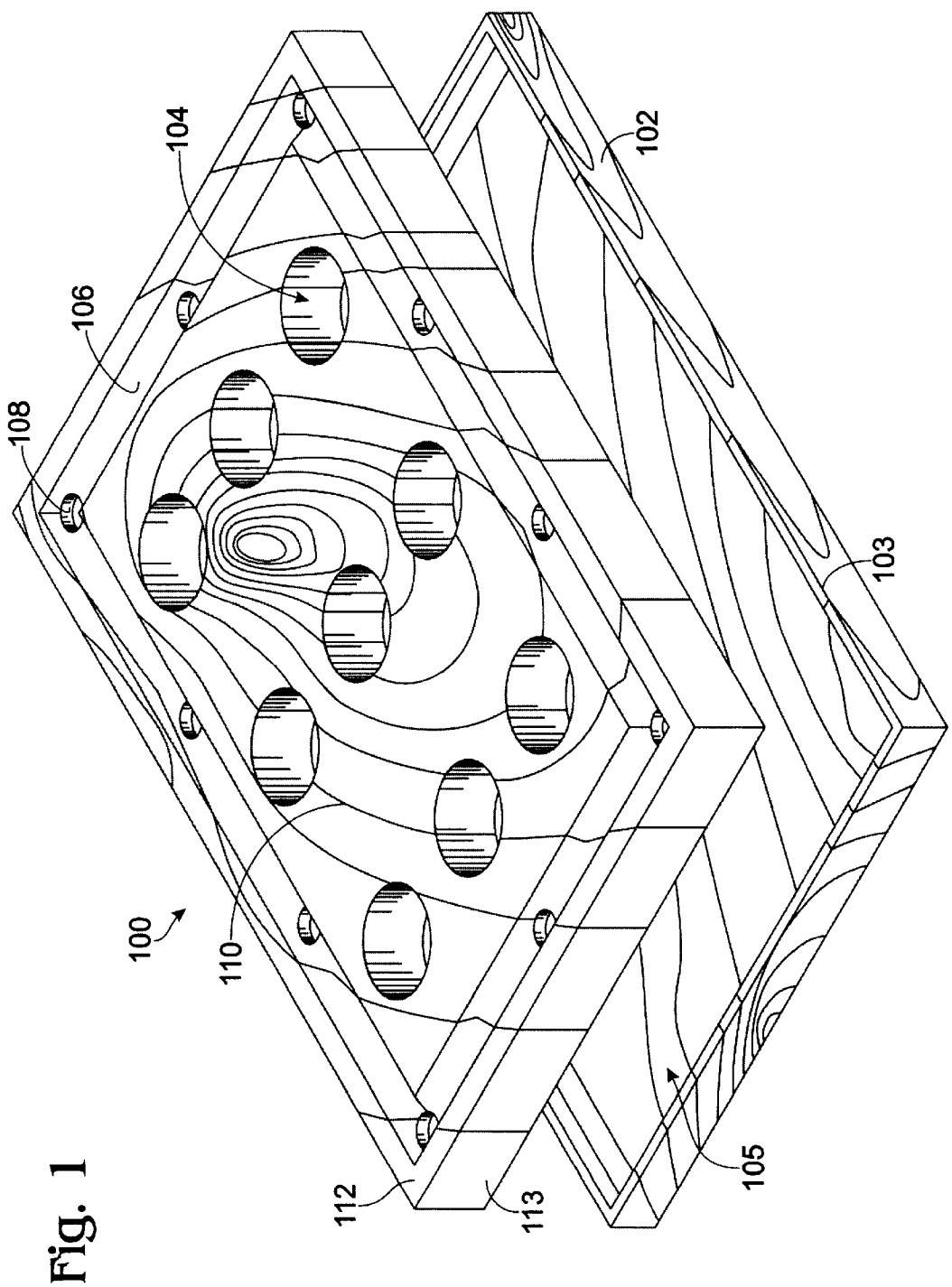
FIG. 1 is a perspective view of a cutting board with drain holes and its collecting pan according to the present invention.
Figure 3:
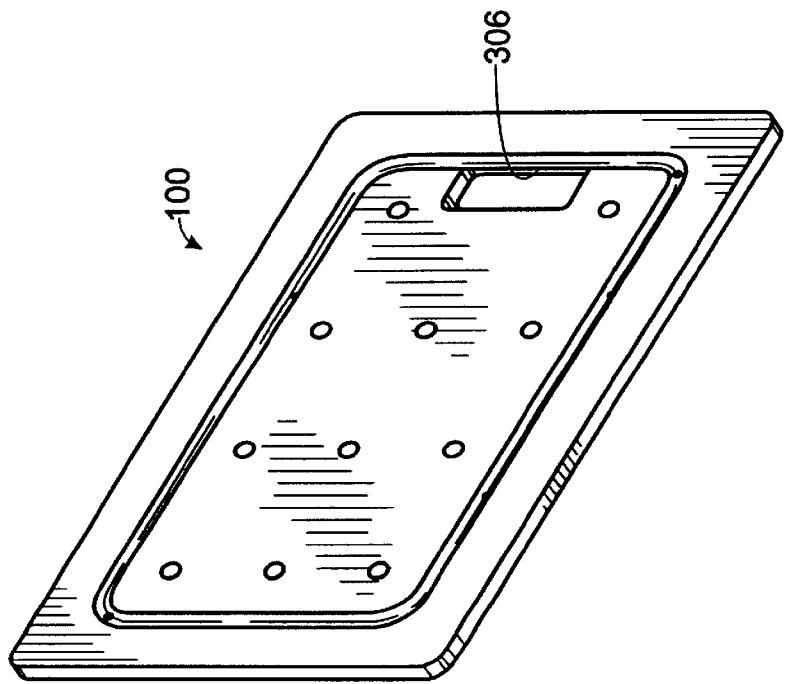
FIG. 3 is a top perspective view of a preferred embodiment of the invention that includes a rectangular opening sized to pass food trimmings into the receptacle.
Figure 4:
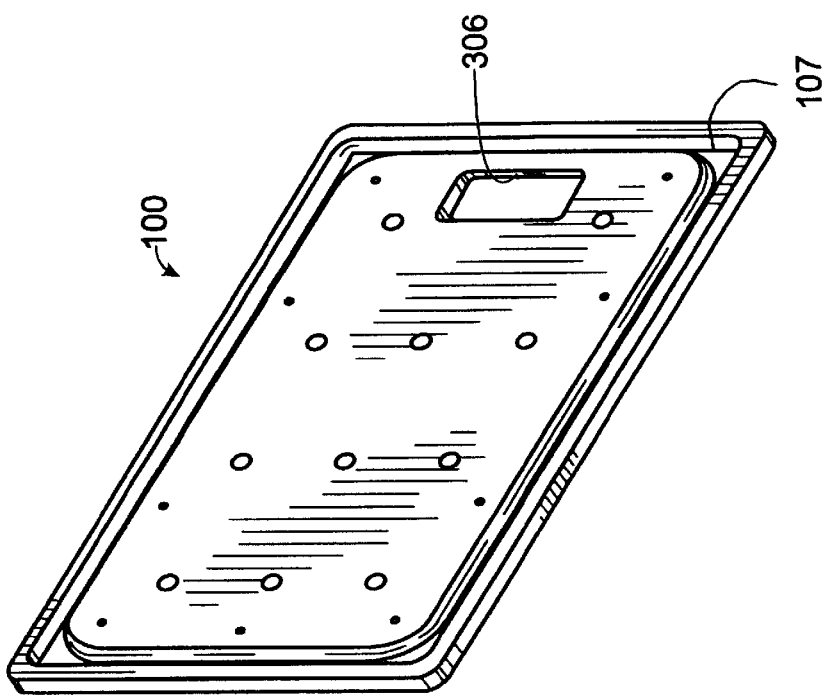
FIG. 4 is a bottom perspective view of a preferred embodiment of the invention that includes a rectangular opening sized to pass food trimmings into the receptacle and a groove along bottom side edges to hold the cutting board securely in place on top of the receptacle.

FIG. 1 shows a perspective view of a cutting board 100 with drain holes 104 and the collecting pan 102 used to collect the juices or fluids that drain from the above cutting board 100. The cutting board 100 and associated collection pan 102 are placed upon a table top surface with the cutting board 100 providing support while a food item is cut. The cutting board 100 has a relatively flat rectangular body with a flat cutting surface 110, 112 and the collection pan 102 is a rectangular shaped receptacle. The cutting board 100 mounts directly on top of the collecting pan 102. The central portion 110 of the cutting board 100 has from 9 to 12 large diameter drain holes 104 for draining juices from the central portion of the cutting board 100 where the cutting of the food takes place. The surface area of the central portion 110 of the cutting surface 110, 112 is large enough to accommodate the large diameter drainage holes 104 and still provide sufficient surface area for supporting the food being prepared, for example, a turkey. In addition, the surface area of the central portion 110 is large enough to provide an adequate preparation area for the food. The large diameter drain holes 104 readily remove juices, drippings, and food trimmings produced during the cutting or carving process. In a preferred embodiment shown in FIGS. 3–4, an additional opening 306 is provided through which larger food pieces such as food trimmings can be passed into the collection pan. While one preferred embodiment is a 2" by 4" rectangular opening, other shapes and sizes of larger opening are possible and within the scope of the invention. A flow trough 106 around the periphery of the cutting board 100 ensures that no juices flow around the sides of the cutting board 100. In a preferred embodiment, the groove or trough 107 is sized to be closely received on top rim of the drain pan 102. In this way the cutting board 100 is prevented from moving laterally relative to the drain pan, and ensures that all drippings are captured in the bottom drain pan. The drain holes 108 disposed within the trough 106 are smaller in diameter than the medial holes 104 of the central portion 110. The trough 106 has from ten to twelve drain holes 108. The number of medial drain holes 104 and the number of trough drain holes 108 can be varied to meet the needs of the food being prepared because some foods are more succulent than other foods. The difference in drain hole diameter between the medial drain holes 104 and the peripheral drain holes 108 reflects the functionality of the cutting board 100. The large diameter medial drain holes 104 are designed to quickly drain the bulk of the juices as they are produced during the cutting process while the smaller diameter trough drain holes 108 are designed to drain off any overflow of juices not drained off by the medial drain holes 104. The diameter of the medial holes 104 is approximately three times the diameter of the trough or peripheral holes 108. The diameters of the drain holes 104, 108 can be varied to meet the needs of the foods being prepared because certain foods generate more juices than other foods.

The drained juices are neatly collected in an accompanying rectangular collection pan 102 and properly discarded. The collection pan 102 has a plurality of side walls 103 defining an opening sized and dimensioned for receiving the cutting board 100 snugly. The collection pan 102 fits neatly underneath the cutting board 100. The cutting board 100 has a peripheral portion 112 that is used for ease of handling of the cutting board 100. Furthermore, the peripheral portion 112 has a plurality of sidewalls 113 which raise the cutting surface 110, 112 above the collection pan 102 to allow fluids to drain through the holes 104, 108 and which form a tight seal around the perimeter of the collection pan 102 when the cutting board 100 is placed down onto the collection pan 102 prior to use. The tight perimeter seal between cutting board 100 and the collecting pan 102 ensures that no juices inadvertently escape from the collecting pan 102.

Figure 2:
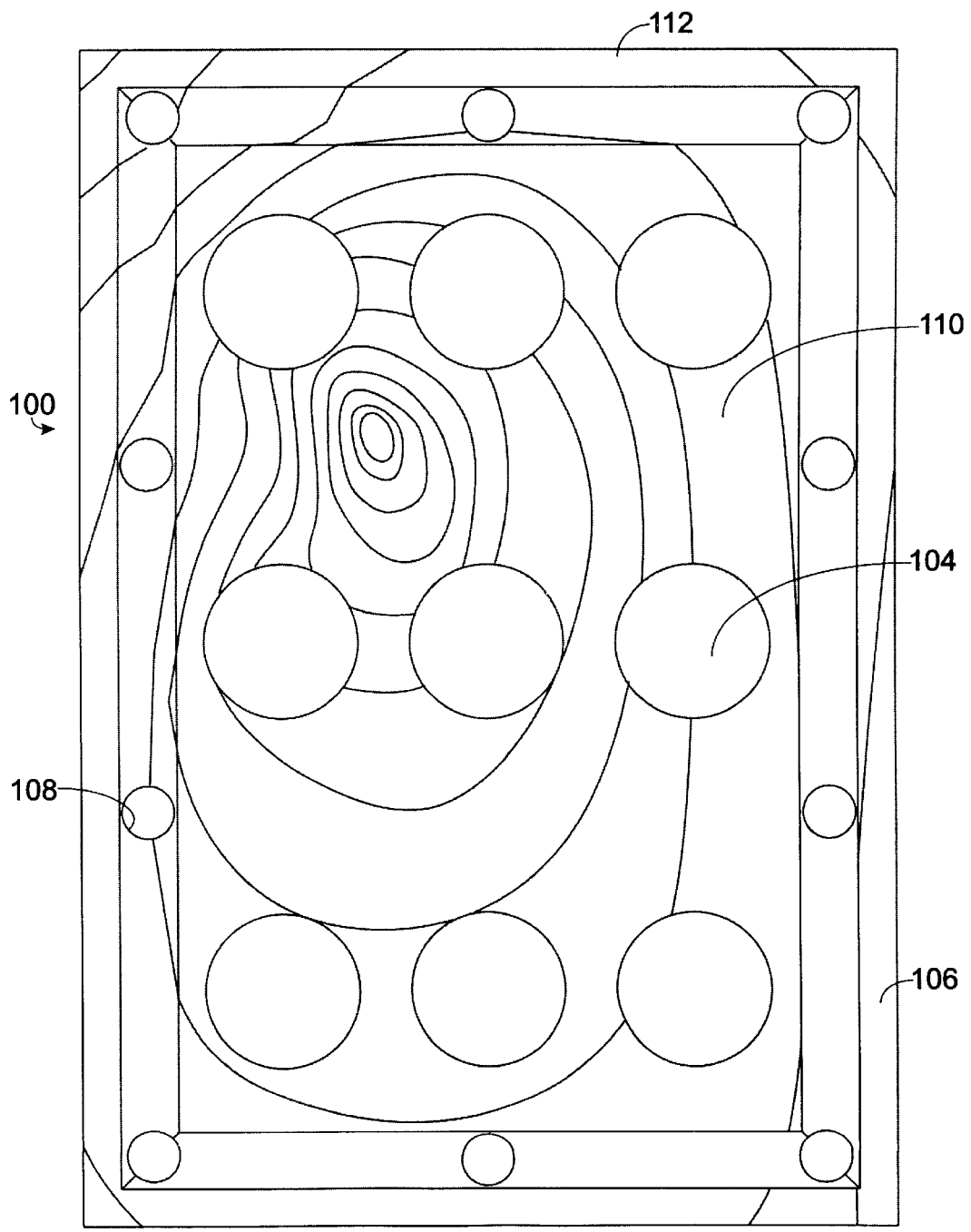
FIG. 2 is a top view of the cutting board showing the disposition of the drain holes.

FIG. 2 is a top view of the cutting board 100 showing the disposition of the drain holes 104, 108. The medial drain holes 104 are symmetrically disposed about the central portion 110 of the cutting board 100 while the trough drain holes 108 are equally spaced along the interior of the trough 106. The cutting board 100 can be scaled up or down in size to meet the specific needs of the user. The cutting board 100 can be made of any suitable material, for example, wood or a synthetic material such as acrylic. The cutting board 100 allows for easy cleanups and eliminates food contamination resulting from the juices of raw meat or poultry which would otherwise spill onto a table or counter surface.

The innovative cutting board of the present invention allows for the quick, easy, and safe preparation of foods without the fear of cross-contamination of the prepared foods. The cutting board and accompanying collection pan are easily cleaned and ready to be used again. The large diameter medial holes of the cutting surface allow for rapid drainage of the cutting surface which results in only a minimal amount of residue remaining on the cutting surface to be cleaned.

The preferred embodiments of the present invention disclosed herein are intended to be illustrative only and are not intended to limit the scope of the invention. It should be understood by those skilled in the art that various modifications and adaptations of the present invention as well as alternative embodiments of the present invention may be contemplated. It is to be understood that the present invention is not limited to the sole embodiments described above, but encompasses any and all embodiments within the scope of the following claims.

What is claimed is:

1. A cutting board comprising:

a relatively flat rectangular body having a cutting surface, said cutting surface having a centrally disposed portion and a peripheral portion wherein said centrally disposed portion and said peripheral portion are separated by a trough defined in said cutting surface, said rectangular body further having a plurality of openings defined in said centrally disposed portion of said cutting surface and a plurality of drain openings defined in said trough;

a rectangular pan receptacle having a plurality of sidewalls defining an opening and forming a receptacle for receiving said fluid from said cutting surface, said rectangular body being removably disposed in the opening defined in said pan receptacle; and, said rectangular body having a bottom surface having a length and a width selected to engage at least one of the rectangular pan sidewalls and position and retain the rectangular body in a predetermined location relative to the receptacle.

2. A cutting board comprising:

a relatively flat rectangular body having a cutting surface, said cutting surface having a centrally disposed portion and a peripheral portion wherein said centrally disposed portion and said peripheral portion are separated by a trough defined in said cutting surface, said rectangular body further having a plurality of symmetrically disposed openings defined in said centrally disposed portion of said cutting surface and a plurality of equally spaced openings defined in said trough which allow for the drainage of fluid from said centrally disposed portion, said rectangular body further having a plurality of side walls depending from the peripheral portion; and a rectangular pan receptacle having a plurality of sidewalls defining an opening and forming a receptacle for receiving said fluid from said cutting surface, said rectangular body being removably disposed in the opening defined in said pan receptacles, the cutting surface defining an opening there through that is sized to pass food trimmings into the receptacle.

3. A cutting board according to claim 1 further comprising the cutting surface defining an opening that is sized to pass food trimmings into the receptacle and said rectangular body bottom surface defining a groove having a length and width selected to engage at least one of the rectangular pan sidewalls and hold the cutting board securely in place on top of the receptacle.

* * * * *